(12) United States Patent
Wiedenhoefer et al.

(10) Patent No.: US 12,152,839 B2
(45) Date of Patent: Nov. 26, 2024

(54) TUBE HEAT EXCHANGER USING 3-TUBE BUNDLES

(71) Applicant: Raytheon Technologies Corporation, Farmington, CT (US)

(72) Inventors: James Fredric Wiedenhoefer, Windsor, CT (US); Jon Erik Sobanski, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/960,883

(22) Filed: Oct. 6, 2022

(65) Prior Publication Data

US 2024/0118035 A1 Apr. 11, 2024

(51) Int. Cl.
*F28D 7/16* (2006.01)

(52) U.S. Cl.
CPC ...................................... *F28D 7/16* (2013.01)

(58) Field of Classification Search
CPC .......................................................... F28D 7/16
See application file for complete search history.

(56) References Cited

U.S. PATENT DOCUMENTS

| | | | | |
|---|---|---|---|---|
| 1,788,673 A * | 1/1931 | Houston | ................. | F25B 9/004 165/122 |
| 2,612,350 A * | 9/1952 | Stadler | ..................... | F28D 7/06 165/DIG. 54 |
| 3,177,934 A * | 4/1965 | Hoppe, Jr. | ............. | D06B 23/22 337/102 |
| 4,136,734 A * | 1/1979 | Sasaki | ........................ | F28B 9/10 122/483 |
| 4,156,457 A * | 5/1979 | Murray | ..................... | F28D 7/06 165/158 |
| 4,483,392 A * | 11/1984 | Korsmo | .................... | F28D 7/08 165/122 |
| 4,561,496 A * | 12/1985 | Kehrer | ................... | F28F 9/0202 122/412 |
| 7,308,932 B2 | 12/2007 | Doh et al. | | |
| 7,779,898 B2 * | 8/2010 | Morrison | ................... | F28D 5/02 165/172 |
| 9,541,331 B2 * | 1/2017 | Nagurny | ................ | F28F 21/084 |
| 9,605,912 B2 * | 3/2017 | Neal | ....................... | F02M 26/32 |
| 11,209,222 B1 * | 12/2021 | Colson | ................... | B33Y 80/00 |
| 2011/0011572 A1 * | 1/2011 | Nagurny | ................ | F28F 21/084 165/172 |

(Continued)

FOREIGN PATENT DOCUMENTS

| | | |
|---|---|---|
| DE | 102005058314 A1 | 6/2007 |
| EP | 0193946 A2 | 9/1986 |

OTHER PUBLICATIONS

European Search Report issued Feb. 6, 2024 in counterpart European Application No. 23201564.4.

*Primary Examiner* — Raheena R Malik
(74) *Attorney, Agent, or Firm* — Bachman & LaPointe, P.C.

(57) ABSTRACT

A heat exchanger including a primary inlet manifold and a primary outlet manifold supporting at least one tube bundle at opposite ends; said at least one tube bundle including an inlet end piece with each of a first tube, a second tube and a third tube fluidly coupled in series to an outlet end piece; and the first tube, the second tube and the third tube forming one of a coiled tube arrangement and a straight tube arrangement.

19 Claims, 8 Drawing Sheets

(56) References Cited

U.S. PATENT DOCUMENTS

| | | | |
|---|---|---|---|
| 2012/0199331 A1* | 8/2012 | Maurer | F28D 7/024 |
| | | | 165/172 |
| 2015/0176466 A1* | 6/2015 | Son | F01N 5/02 |
| | | | 60/624 |
| 2017/0016678 A1* | 1/2017 | Singh | F28D 7/1646 |
| 2017/0276440 A1* | 9/2017 | Kenworthy | F28F 1/32 |
| 2018/0156512 A1* | 6/2018 | Mislak | F28F 9/0265 |
| 2018/0283794 A1 | 10/2018 | Cerny et al. | |
| 2020/0224974 A1* | 7/2020 | Turney | F28D 7/08 |

\* cited by examiner

Section A-A

Section B-B

TUBE HEAT EXCHANGER USING 3-TUBE BUNDLES

BACKGROUND

The present disclosure is directed to the improved tube heat exchanger and particularly a triple pass three tube bundle assembly.

Tubular heat exchangers comprise a tubular shell through which a first fluid flows. The tubular shell may contain baffles for directing the flow of the first fluid along a convoluted path from an inlet to an outlet. A number of tubes (a tube bundle) carrying a second fluid extend from a tube manifold or tube sheet within the tubular shell so that heat exchange can occur between the first and second fluids through the walls of the tubes. Tubular heat exchangers are commonly used where one or both of the fluids is/are at a high pressure.

High pressure, tube style heat exchangers may contain thousands of small diameter (OD<0.100") tubes. A 3-Pass heat exchanger arrangement is ideal for increasing performance but usually leads to complex manifold arrangements. What is needed is a 3-pass, 3-tube bundle that allows for a simple, cross-flow manifold layout while providing the improved heat transfer characteristics of a multi-pass heat exchanger.

SUMMARY

In accordance with the present disclosure, there is provided a heat exchanger comprising a primary inlet manifold and a primary outlet manifold supporting at least one tube bundle at opposite ends; said at least one tube bundle comprising an inlet end piece with each of a first tube, a second tube and a third tube fluidly coupled in series to an outlet end piece; and the first tube, the second tube and the third tube forming one of a coiled tube arrangement and a straight tube arrangement.

A further embodiment of any of the foregoing embodiments may additionally and/or alternatively include each of the inlet end piece and the outlet end piece are configured the same.

A further embodiment of any of the foregoing embodiments may additionally and/or alternatively include each of the inlet end piece and the outlet end piece comprises a port; the port of the inlet end piece configured to fluidly couple with the primary inlet manifold; the port of the outlet end piece configured to fluidly couple with the primary outlet manifold.

A further embodiment of any of the foregoing embodiments may additionally and/or alternatively include the heat exchanger comprises a 3-pass topology.

A further embodiment of any of the foregoing embodiments may additionally and/or alternatively include the port is fluidly coupled with one of a flow inlet or a discharge outlet of a tube.

A further embodiment of any of the foregoing embodiments may additionally and/or alternatively include the outlet end piece includes a first turn portion fluidly coupled between the first tube and the second tube.

A further embodiment of any of the foregoing embodiments may additionally and/or alternatively include the inlet end piece includes a second turn portion fluidly coupled between the second tube and the third tube.

A further embodiment of any of the foregoing embodiments may additionally and/or alternatively include the at least one tube bundle comprises a first pass fluidly extending from the inlet end piece through a first tube into the outlet end piece.

A further embodiment of any of the foregoing embodiments may additionally and/or alternatively include the at least one tube bundle comprises a second pass fluidly extending from the outlet end piece through a second tube into the inlet end piece.

A further embodiment of any of the foregoing embodiments may additionally and/or alternatively include the at least one tube bundle comprises a third pass fluidly extending from the inlet end piece through a third tube into the outlet end piece.

A further embodiment of any of the foregoing embodiments may additionally and/or alternatively include each of the first tube, the second tube and the third tube includes a first end opposite a second end with a central section spanning between the first end and second end; the central section is configured to be exposed to the external flow; and each of the first tube, the second tube and the third tube includes a first straight section proximate the first end and a second straight section proximate the second end.

A further embodiment of any of the foregoing embodiments may additionally and/or alternatively include each of the first tube, the second tube and the third tube includes a first transition zone located between the first straight section and the central section; wherein each of the first tube, the second tube and the third tube includes a second transition zone located between the second straight section and the central section; wherein the first transition zone and second transition zone are shaped with a smooth helical pitch that transitions from a straight walled configuration to a constant pitch of the central section.

A further embodiment of any of the foregoing embodiments may additionally and/or alternatively include the at least one tube bundle comprises a coil damper; wherein the coil damper comprises a unitary structure body having three webs each of the three webs having semicircular shaped internal edges configured to receive exterior surfaces of tubes; the unitary structure body including gaps between each of the three webs configured for insertion of the tubes in between the webs for contact with the internal edges.

A further embodiment of any of the foregoing embodiments may additionally and/or alternatively include wherein each of the inlet end piece and the outlet end piece comprise at least one end piece receiver configured as a right circular cylinder for insertion connection with straight sections of tube ends.

In accordance with the present disclosure, there is provided a process of utilizing a heat exchanger, the process comprising providing a primary inlet manifold and a primary outlet manifold supporting at least one tube bundle at opposite ends; fluidly coupling an inlet end piece of said at least one tube bundle with an outlet end piece of said at least one tube bundle; and fluidly coupling in series the inlet end piece with each of a first tube, a second tube and a third tube to the outlet end piece.

A further embodiment of any of the foregoing embodiments may additionally and/or alternatively include each of the inlet end piece and the outlet end piece comprises a port; fluidly coupling the port of the inlet end piece with the primary inlet manifold; and fluidly coupling the port of the outlet end piece with the primary outlet manifold.

A further embodiment of any of the foregoing embodiments may additionally and/or alternatively include the process further comprising fluidly coupling the port with one of a flow inlet or a discharge outlet of a tube.

A further embodiment of any of the foregoing embodiments may additionally and/or alternatively include the process further comprising forming the first tube, the second tube and the third tube into one of a coiled tube arrangement or a straight tube arrangement.

A further embodiment of any of the foregoing embodiments may additionally and/or alternatively include the process further comprising fluidly coupling the heat exchanger into a 3-pass topology.

By bundling tubes into a small group, bonded to a small endcap like, secondary manifold, a 3-pass topology is possible but with using a simple 1-pass layout for the main heat exchanger.

Other details of the heat exchanger are set forth in the following detailed description and the accompanying drawings wherein like reference numerals depict like elements.

DETAILED DESCRIPTION

Figure 1:
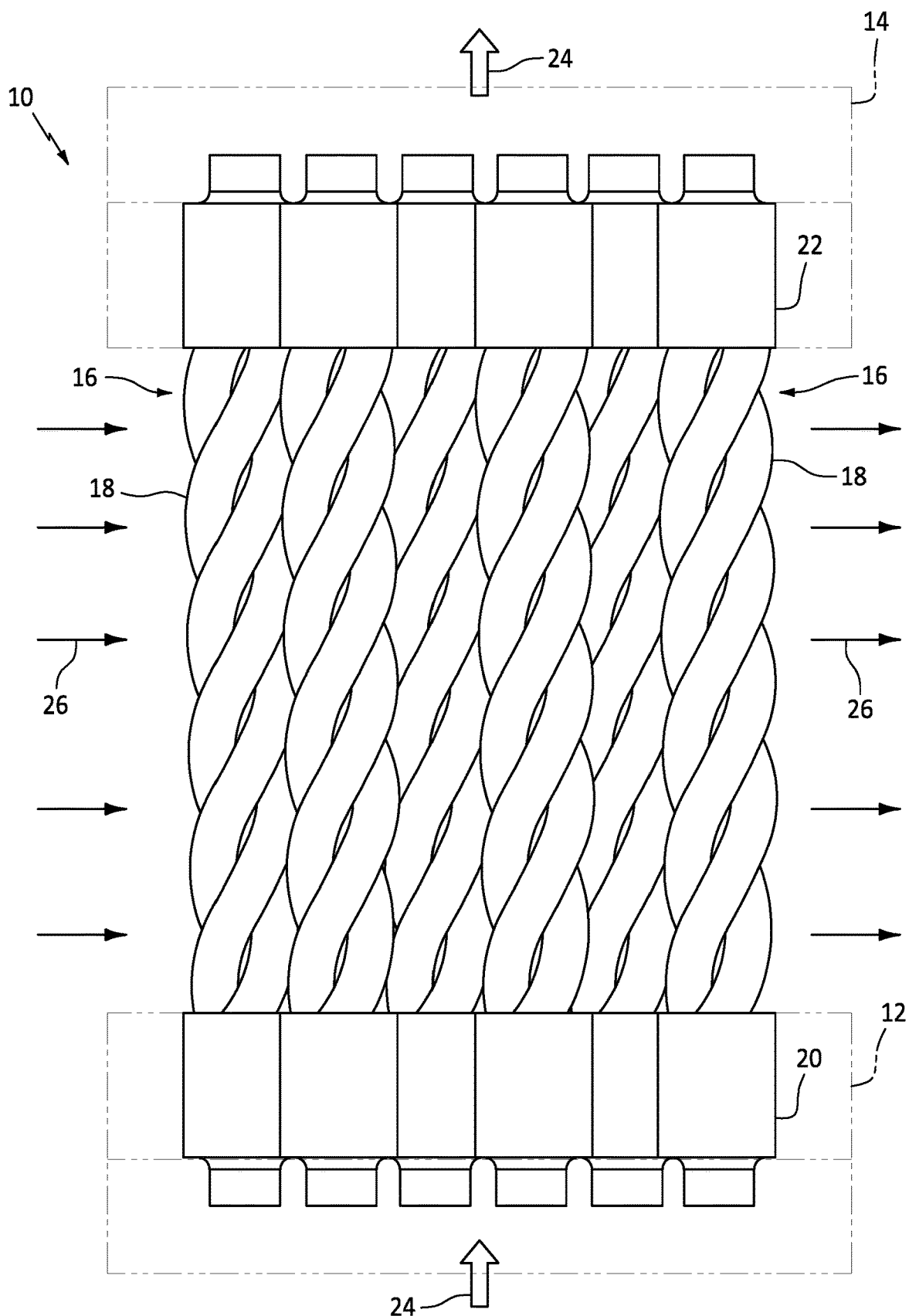
FIG. 1 is a schematic representation of an exemplary heat exchanger.
Figure 2:
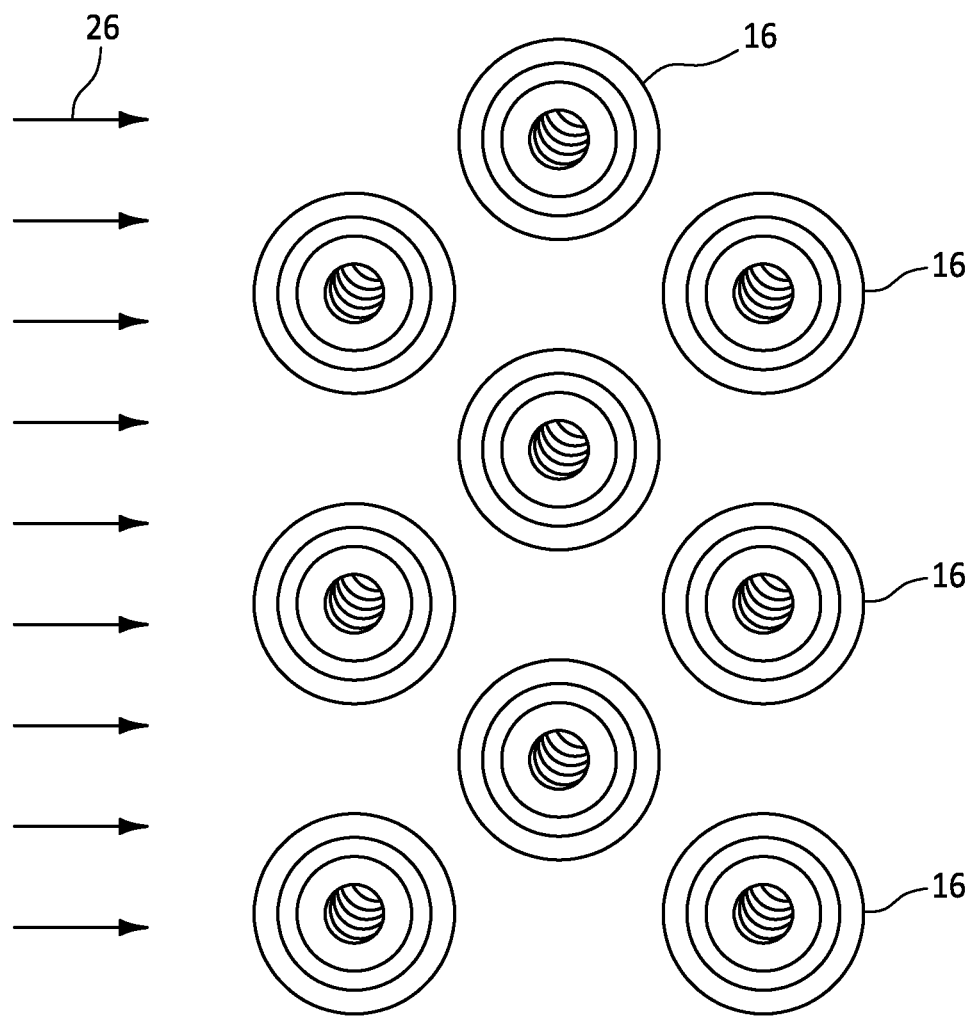
FIG. 2 is a schematic representation of the exemplary heat exchanger of FIG. 1.
Figure 3:
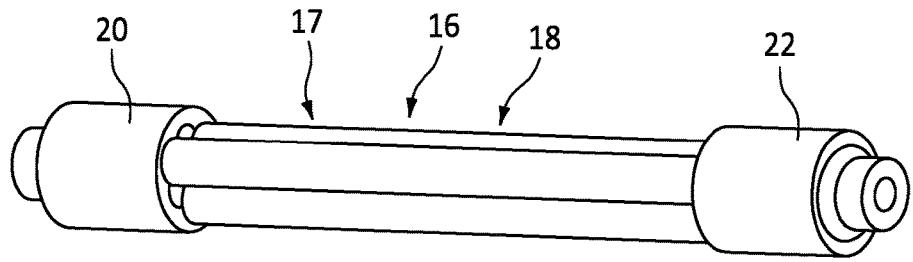
FIG. 3 is a schematic representation of an exemplary tub bundle.
Figure 4:
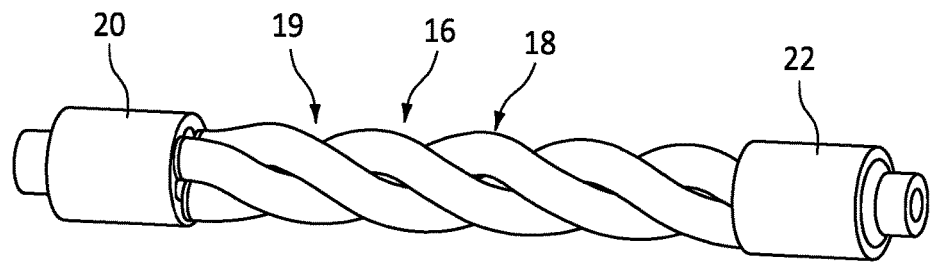
FIG. 4 is a schematic representation of an exemplary tub bundle.

Referring now to FIGS. 1 and 2, there is illustrated an exemplary heat exchanger 10. The heat exchanger 10 includes a primary inlet manifold 12 and a primary outlet manifold 14 supporting at least one tube bundle 16. The heat exchanger 10 can include thousands of small diameter tubes 18 arranged into multiple tube bundles 16. Each tube bundle 16 can include 3 tubes 18 mounted between an inlet end piece 20 and an outlet end piece 22. The tube 18 can be a hypodermic size tube 18 having an outside diameter of less than 0.100 inch. In an exemplary embodiment, the outside diameter can range from 0.040-0.140 inch.

The heat exchanger 10 can be a 3-pass topology. A working fluid 24 can enter the primary inlet manifold 12, pass through the tube bundle 16 three times and exit through the primary outlet manifold 14. An external flow 26, such as air from a gas turbine engine (not shown), can pass over the tube bundles 16 on the exterior 64 of the tube bundles 16. The heat exchanger 10 can be operated with high pressure working fluids 24. Depending on the working fluid 24, pressures can range from 1 psi to 5000 psi.

Referring also to FIGS. 3-13, the tube bundle 16 can be described in more detail. The tube bundle 16 can include 3 tubes 18 as shown. It is contemplated that more or less tubes 18 can be included with the tube bundle 16. The tube bundle 16 shown in FIGS. 3 and 5-6 include a straight tube arrangement 17. The tube bundles 16 shown in FIGS. 1, 4, 7-8 are shown with a coiled tube arrangement 19. The coiled tubes 18 are configured to flex and take up thermal strain. The coiled tube arrangement 19 also provides desirable interaction of the external flow 26, as the external flow 26 passes through and around the tube bundle 16.

The flow of working fluid 24 through the tube bundle 16 follows a path into a flow inlet 27 proximate the inlet end piece 20, through a first tube 28 into the outlet end piece 22 completing a first pass. The working fluid 24 then turns inside the outlet end piece 22 at a first turn 30 and is directed into the second tube 32. The working fluid 24 flows through the second tube 32 back to the inlet end piece 20 completing a second pass. The working fluid 24 then turns inside the inlet end piece 20 at a second turn 34. The working fluid 24 then flows into a third tube 36 toward the outlet end piece 22 to complete a third pass. The working fluid 24 then passes through the outlet end piece 22 exiting through a discharge outlet 38. In an exemplary embodiment, the inlet end piece 20 and the outlet end piece 22 can be configured as secondary manifolds. The distribution of the mass flow of the working fluid 24 can be evenly distributed between the first tube 28, second tube 32 and third tube 36.

Figure 7:
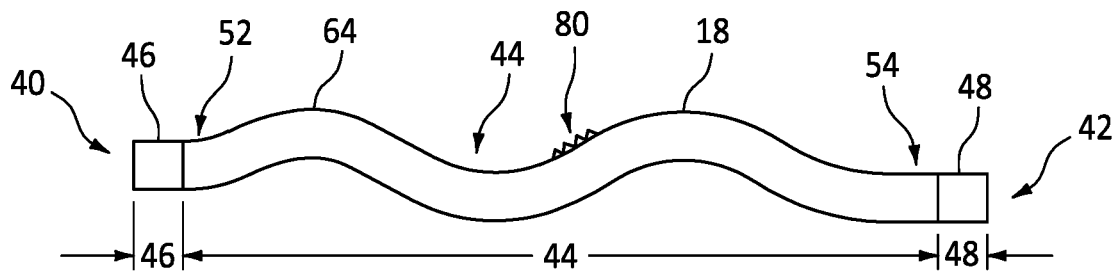
FIG. 7 is a schematic representation of an exemplary tube.
Figure 12:
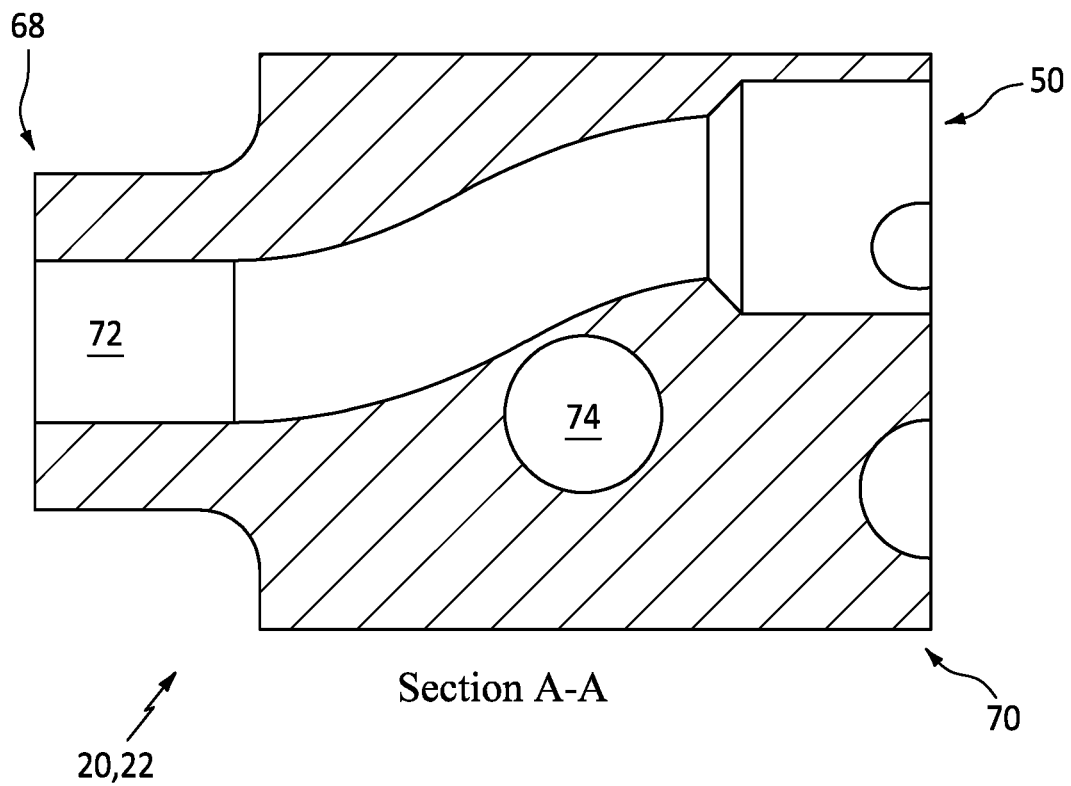
FIG. 12 is a cross sectional view A-A of FIG. 11 schematic representation of an exemplary end piece.

As seen in FIG. 7, an exemplary tube 18 is configured for a coiled bundle assembly 16. The tube 18 can include a first end 40 opposite a second end 42 with a central section 44 spanning between the first end 40 and second end 42. The central section 44 is configured to be exposed to the external flow 26. The tube 18 includes a first straight section 46 proximate the first end 40. The tube includes a second straight section 48 proximate the second end 42. The first straight section 46 and the second straight section 48 include straight pipe walls that are configured to insert into end piece receivers 50 of the respective end piece 20, 22. A first transition zone 52 is located between the first straight section 46 and the central section 44. A second transition zone 54 is located between the second straight section 48 and the central section 44. The first transition zone 52 and second transition zone 54 are shaped with a smooth helical pitch that transitions from the straight walled configuration to a constant pitch of the central section 44 as seen in FIG. 7. The transition zones 52, 54 are configured to alleviate stress at the end pieces 20, 22. The tubes 18 in the bundle 16 are configured to be coiled about a constant pitch for the bulk portion of the tube 18 exposed to the external flow 26.

Figure 8:
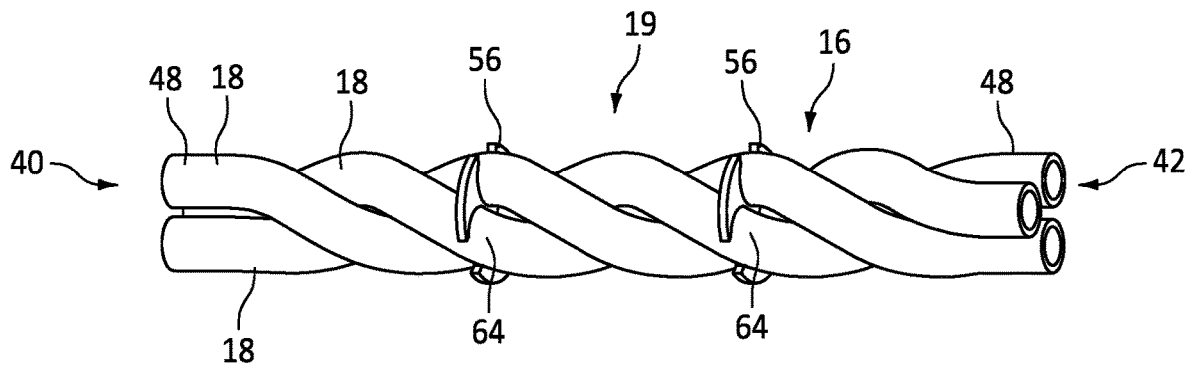
FIG. 8 is a schematic representation of an exemplary tube bundle with damper.
Figure 13:
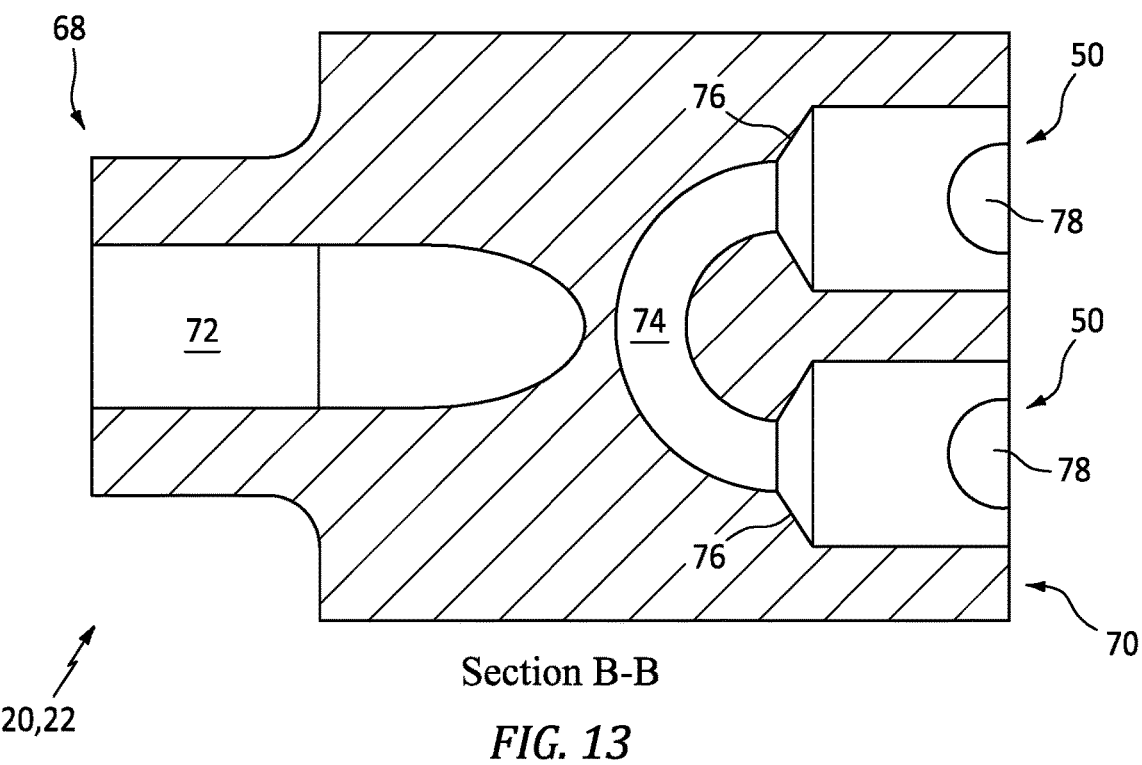
FIG. 13 is a cross sectional view B-B of FIG. 11 schematic representation of an exemplary end piece.
Figure 9:
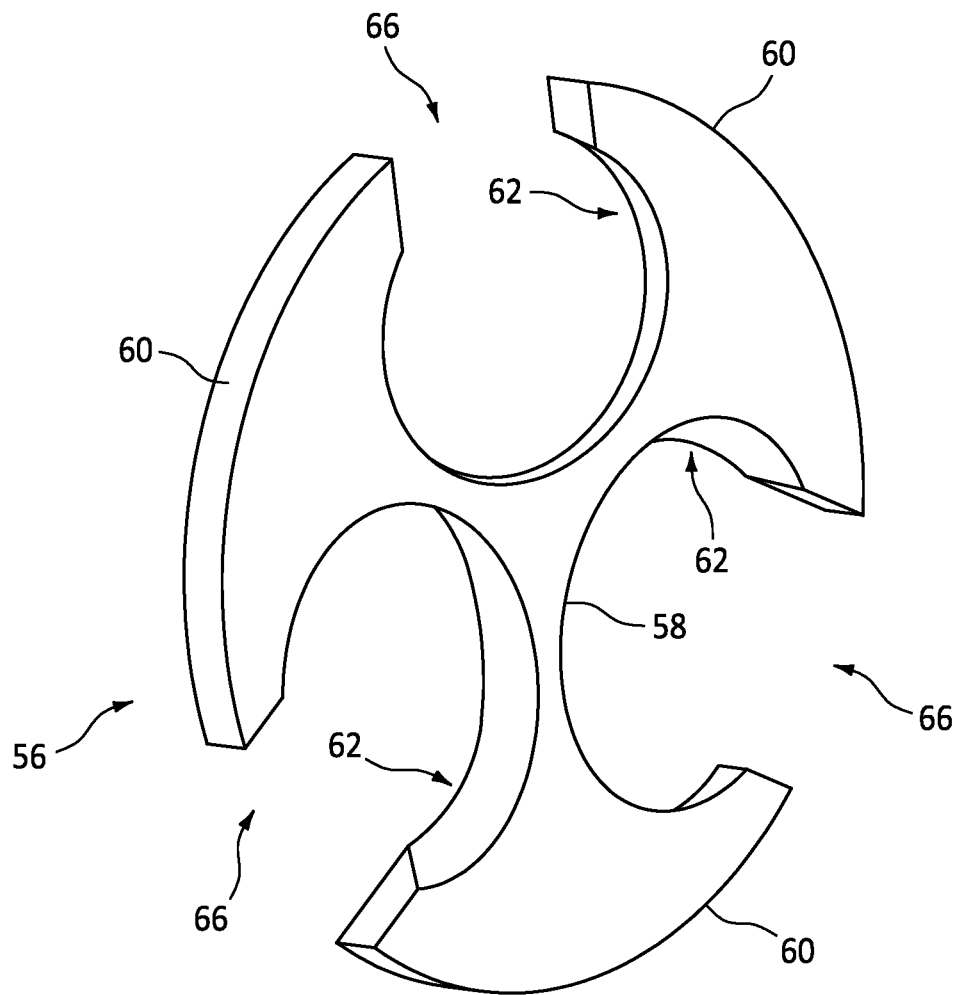
FIG. 9 is a schematic representation of an exemplary damper.
Figure 10:
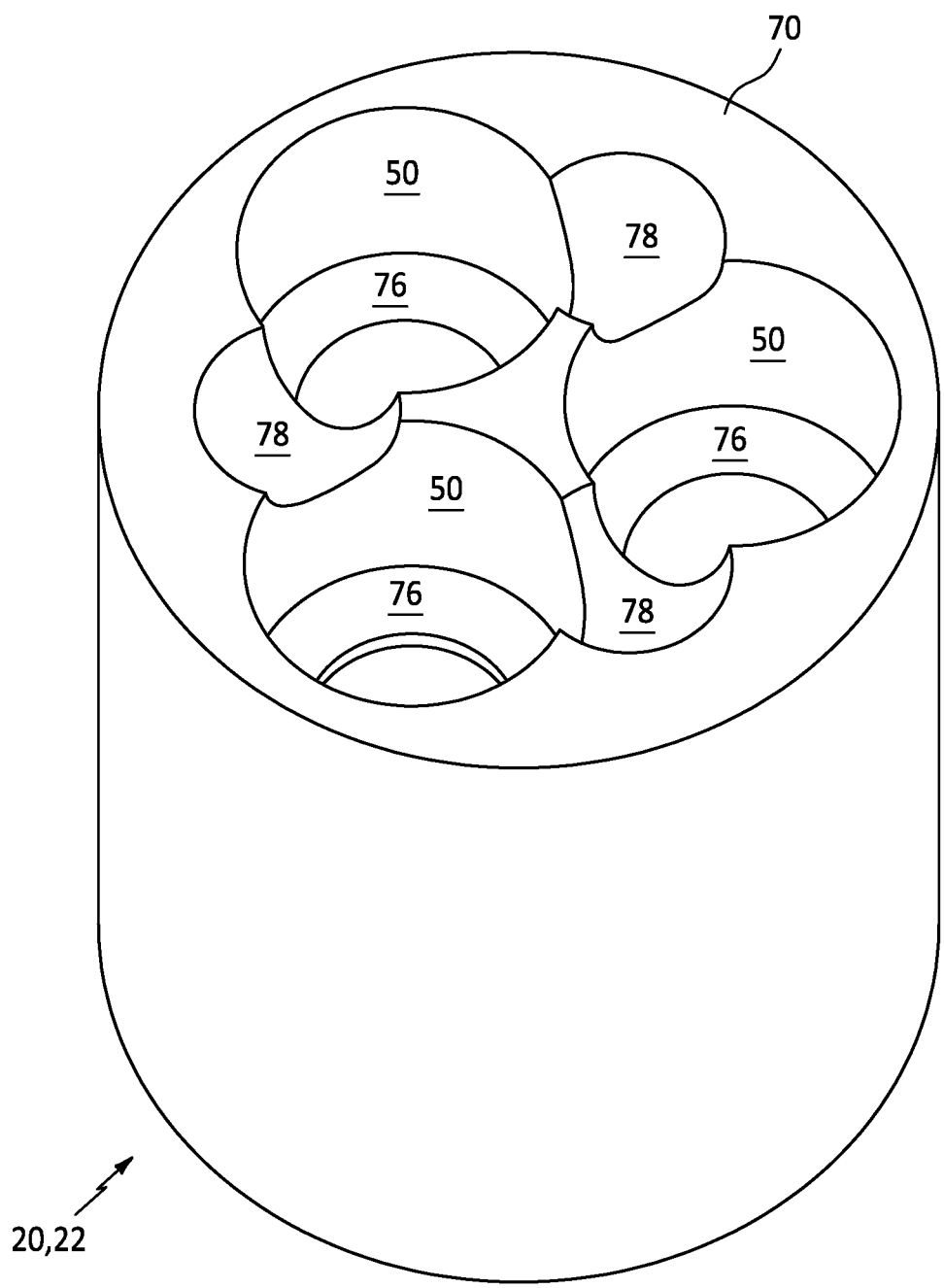
FIG. 10 is an isometric view schematic representation of an exemplary end piece.
Figure 11:
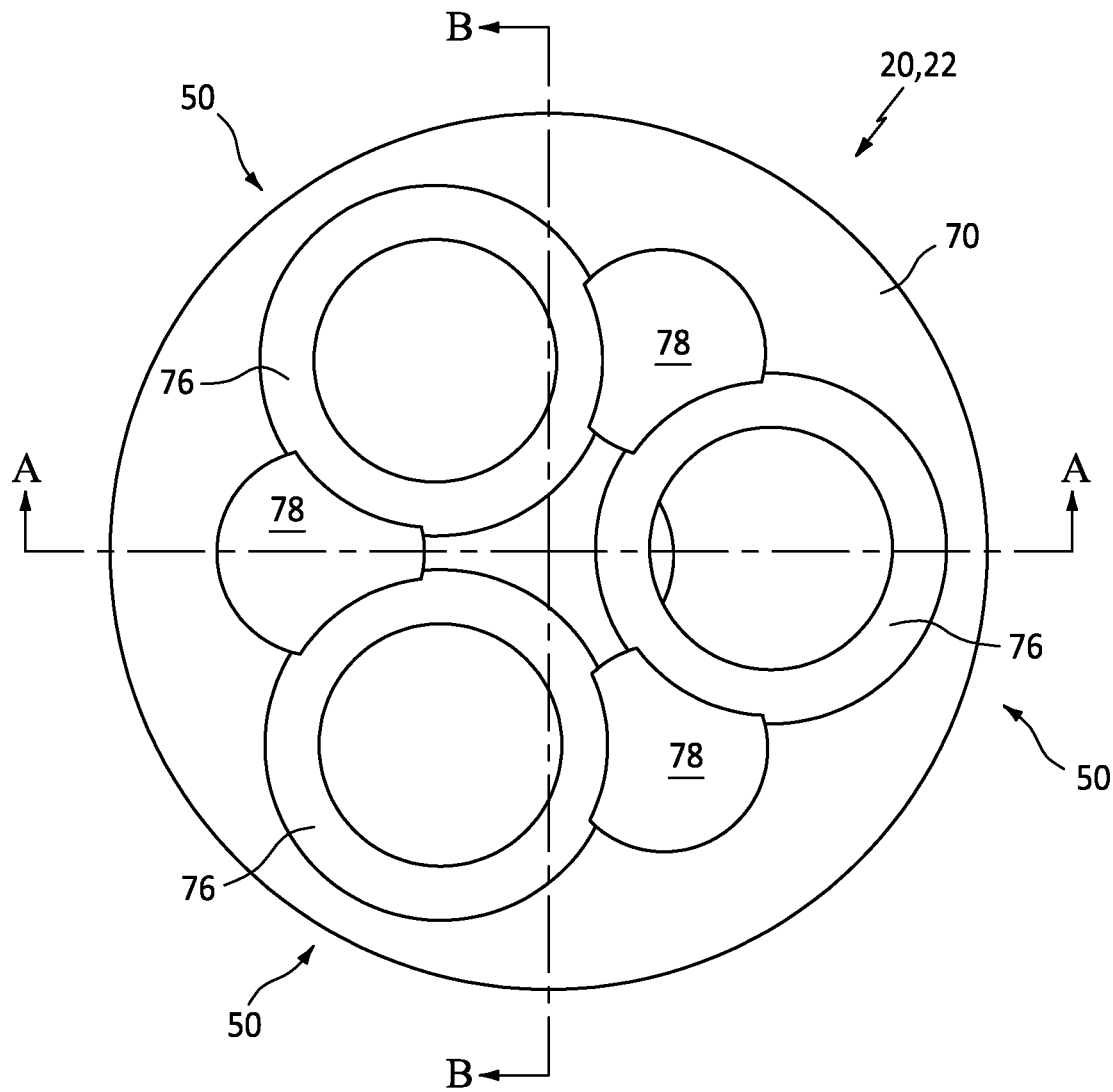
FIG. 11 is an end view schematic representation of an exemplary end piece.

Referring also to FIG. 8 and FIG. 9, a coiled tube assembly is seen with a coil damper 56. The coil damper 56 includes a unitary structure body 58. In the embodiment shown at FIG. 9, the unitary structure body 58 includes three webs 60 each having semicircular shaped internal edges 62 configured to receive the exterior surfaces 64 of the tubes 18. The unitary structure body 58 includes gaps 66 between each of the webs 60 configured to allow for insertion of the tubes 18 in between the webs 60 for contact with the internal edges 62. The coil damper 56 can be made of a compliant high temperature material, such as high elastomer rubber, acetal homopolymer (Polyoxymethylene) branded as Delrin® and the like. The coil damper 56 aids in pre-assembly of the tube bundles 16. The coil damper 56 provides support for the tubes 18 in the tube bundle 16 and reduces vibration in the tubes 18. The coil damper 56 also helps to reduce stress at the tube 18 and end piece 20, 22 locations. The coil damper 56 helps mitigate high cycle fatigue based stress that can be induced by engine based vibrations or aerodynamic loads to the tubes 18.

Referring also to FIGS. 10-13 the end pieces 20, 22 are shown in more detail. The end pieces 20, 22 are constructed to be identical, that is configured the same. The end pieces 20, 22 include a first end 68 and a second end 70 opposite the first end 68. The first end 68 can include a port 72 that couples with either one of the primary inlet manifold 12 or primary outlet manifold 14 with the flow inlet 27 or the discharge outlet 38 of the tube 18. The end pieces 20, 22 include a turn portion 74. The turn portion 74 accommodates the first turn 30 and second turn 34 which couple the first tube 28 to the second tube 32 and the second tube 32 to the third tube 36 respectfully.

The end pieces 20, 22 include the end piece receivers 50. The end piece receivers 50 are configured as right circular cylinders that can accept insertion connections with the straight sections 46, 48 of the tube 18 ends 40, 42. The receivers 50 include a chamfer portion 76 configured to support additive manufacturing of the end pieces 20, 22. The end pieces 20, 22 include braze pockets 78. The braze pocket 78 is configured as a partial concavity between each of the receivers 50. The braze pockets 78 are configured to accept braze material during a brazing assembly of the tube bundle 16. The tubes 18 are inserted into the respective receivers 50. Braze material is added to the braze pockets 78. The braze pockets 78 accept and hold braze material, such that braze material can flow evenly between the tube 18 and the receiver 50 after the tubes 18 and the receivers 50 are heated to brazing temperature. Capillary action draws the braze material between the tube 18 and receiver 50.

The end pieces 20, 22 can be manufactured by use of Additive Manufacturing, such as Direct Metal Laser Melting techniques, or Metal Injection Mold techniques and the like. The outer surfaces of the end pieces 20, 22 can be ground to precision tolerances or can be plunge EDM. The receivers 50 can be reamed to acceptable tolerances.

Figure 5:
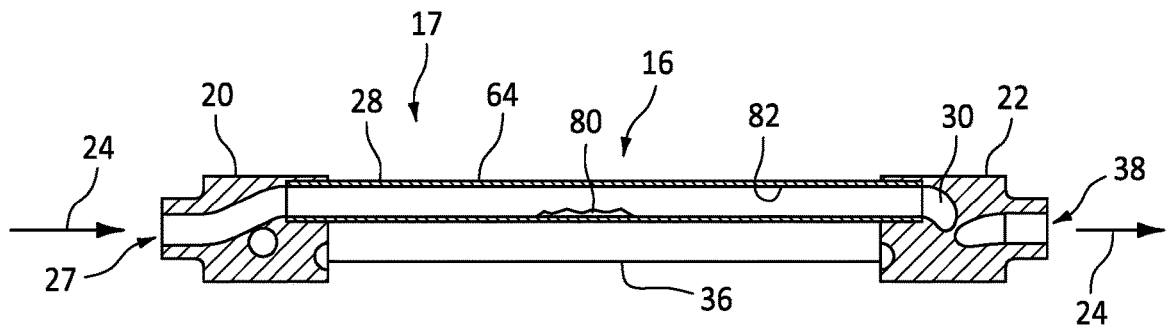
FIG. 5 is a schematic representation cross sectional view of an exemplary tub bundle.
Figure 6:
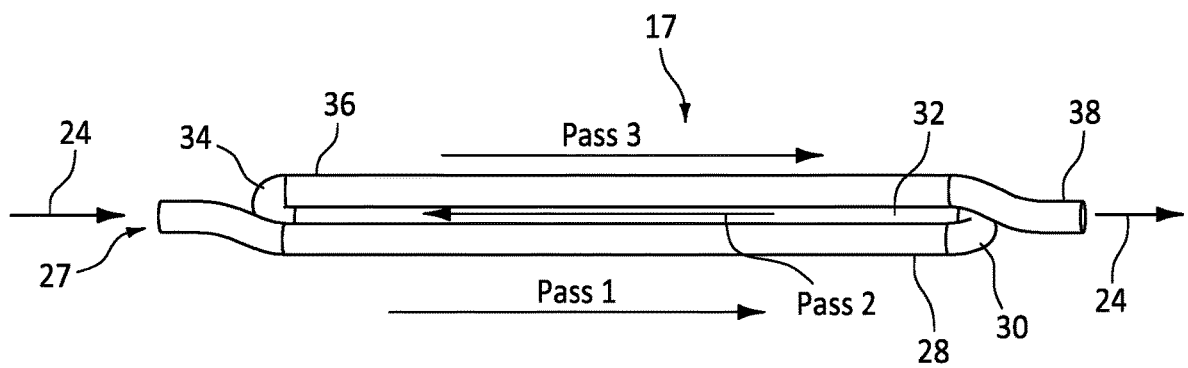
FIG. 6 is a schematic representation of an exemplary tub bundle.

In an exemplary embodiment, the exterior surface 64 of the tube 18 can have a smooth surface or have a surface augmentation 80 as shown in FIG. 7. An interior surface 82 of the tube 18 can have a smooth surface or have a surface augmentation 80 as shown in FIG. 5.

A technical advantage of the disclosed heat exchanger includes a three small diameter tube configuration bonded to an endcap manifold with porting within the endcap that produces a 3-pass flow structure.

Another technical advantage of the disclosed heat exchanger includes each individual tube that is installed into a simple, 1-pass style heat exchanger.

Another technical advantage of the disclosed heat exchanger includes tubes that are coiled to produce good exposure to external flow field and to take up thermal strain.

Another technical advantage of the disclosed heat exchanger includes 3-tube bundles that can be pressure tested before main assembly.

Another technical advantage of the disclosed heat exchanger includes a design that reduces the number of braze joints in the heat exchanger by a factor of 3×.

Another technical advantage of the disclosed heat exchanger includes a simple, 1-pass topology for primary inlet and outlet manifolds.

Another technical advantage of the disclosed heat exchanger includes easier installation of the heat exchanger in engine compartments.

Another technical advantage of the disclosed heat exchanger includes an increase in effective flow length by 3×.

Another technical advantage of the disclosed heat exchanger includes larger bundles are easier to handle for assembly.

Another technical advantage of the disclosed heat exchanger includes higher efficiencies are possible with the 3-pass bundle.

Another technical advantage of the disclosed heat exchanger includes each 3-tube bundle can be pressure tested before assembly.

Another technical advantage of the disclosed heat exchanger includes vortex shedding on coiled tubes produces a favorable downstream flow field.

Another technical advantage of the disclosed heat exchanger include orientation of the main assembly is flexible.

Another technical advantage of the disclosed heat exchanger includes the use of mandrel drawn tubing which is less expensive and more durable and an equivalently built additive tube bundle structure.

Another technical advantage of the disclosed heat exchanger include end piece construction is inexpensive and relatively easy to manufacture.

There has been provided a heat exchanger. While the heat exchanger has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A heat exchanger comprising:
 a primary inlet manifold and a primary outlet manifold supporting at least one tube bundle at opposite ends;
 said at least one tube bundle comprising:
  an inlet end piece with each of a first tube, a second tube and a third tube fluidly coupled in series to an outlet end piece, wherein said outlet end piece includes a first turn portion fluidly coupled between the first tube and the second tube; and
  the first tube, the second tube and the third tube forming one of a coiled tube arrangement and a straight tube arrangement.

2. The heat exchanger according to claim 1, wherein each of the inlet end piece and the outlet end piece are configured the same.

3. The heat exchanger according to claim 1, wherein each of the inlet end piece and the outlet end piece comprises a port; the port of the inlet end piece configured to fluidly couple with the primary inlet manifold; the port of the outlet end piece configured to fluidly couple with the primary outlet manifold.

4. The heat exchanger according to claim 1, wherein the heat exchanger comprises a 3-pass topology in series between the inlet end piece and the outlet end piece.

5. The heat exchanger according to claim 3, wherein the port is fluidly coupled with one of a flow inlet or a discharge outlet of a tube.

6. The heat exchanger according to claim 1, wherein said inlet end piece includes a second turn portion fluidly coupled between the second tube and the third tube.

7. The heat exchanger according to claim 1, wherein said at least one tube bundle comprises a first pass fluidly extending from the inlet end piece through the first tube into the outlet end piece.

8. The heat exchanger according to claim 1, wherein said at least one tube bundle comprises a second pass fluidly extending from the outlet end piece through the second tube into the inlet end piece.

9. The heat exchanger according to claim 1, wherein said at least one tube bundle comprises a third pass fluidly extending from the inlet end piece through the third tube into the outlet end piece.

10. The heat exchanger according to claim 1, wherein each of the first tube, the second tube and the third tube includes a first end opposite a second end with a central section spanning between the first end and second end; the central section is configured to be exposed to the external flow; and each of the first tube, the second tube and the third tube includes a first straight section proximate the first end and a second straight section proximate the second end.

11. The according to claim 10, wherein each of the first tube, the second tube and the third tube includes a first transition zone located between the first straight section and the central section; wherein each of the first tube, the second tube and the third tube includes a second zone located between the second straight section and the central section; wherein the first transition zone and second transition zone are shaped with a smooth helical pitch that transitions from a straight walled configuration to a constant pitch of the central section.

12. The heat exchanger according to claim 1, wherein said at least one tube bundle comprises a coil damper; wherein said coil damper comprises a unitary structure body having three webs each of the three webs having semicircular shaped internal edges configured to receive exterior surfaces of tubes; the unitary structure body including gaps between each of the three webs configured for insertion of the tubes in between the webs for contact with the internal edges.

13. The heat exchanger of claim 1, wherein each of the inlet end piece and the outlet end piece comprise at least one end piece receiver configured as a right circular cylinder for insertion connection with straight sections of tube ends.

14. A process of utilizing a heat exchanger, the process comprising:
providing a primary inlet manifold and a primary outlet manifold supporting at least one tube bundle at opposite ends;
fluidly coupling an inlet end piece of said at least one tube bundle with an outlet end piece of said at least one tube bundle; and
fluidly coupling in series the inlet end piece with each of a first tube, a second tube and a third tube to the outlet end piece, wherein said outlet end piece includes a first turn portion fluidly coupled between the first tube and the second tube, wherein said inlet end piece includes a second turn portion fluidly coupled between the second tube and the third tube.

15. The process of claim 14, wherein each of the inlet end piece and the outlet end piece comprises a port;
fluidly coupling the port of the inlet end piece with the primary inlet manifold; and
fluidly coupling the port of the outlet end piece with the primary outlet manifold.

16. The process of claim 15, further comprising:
fluidly coupling the port with one of a flow inlet or a discharge outlet of a tube.

17. The process of claim 14, further comprising:
forming the first tube, the second tube and the third tube into one of a coiled tube arrangement or a straight tube arrangement.

18. The process of claim 14, further comprising:
fluidly coupling the heat exchanger into a 3-pass topology.

19. A heat exchanger comprising:
a primary inlet manifold and a primary outlet manifold supporting at least one tube bundle at opposite ends;
said at least one tube bundle comprising:
an inlet end piece with each of a first tube, a second tube and a third tube fluidly coupled in series to an outlet end piece; and
the first tube, the second tube and the third tube forming one of a coiled tube arrangement and a straight tube arrangement, wherein each of the first tube, the second tube and the third tube includes a first end opposite a second end with a central section spanning between the first end and second end; the central section is configured to be exposed to the external flow; and each of the first tube, the second tube and the third tube includes a first straight section proximate the first end and a second straight section proximate the second end; wherein each of the first tube, the second tube and the third tube includes a first transition zone located between the first straight section and the central section; wherein each of the first tube, the second tube and the third tube includes a second transition zone located between the second straight section and the central section; wherein the first transition zone and second transition zone are shaped with a smooth helical pitch that transitions from a straight walled configuration to a constant pitch of the central section.

\* \* \* \* \*